T. C. WHITEHEAD.
VEHICLE WHEEL.
APPLICATION FILED FEB. 21, 1921.
1,433,164.
Patented Oct. 24, 1922.
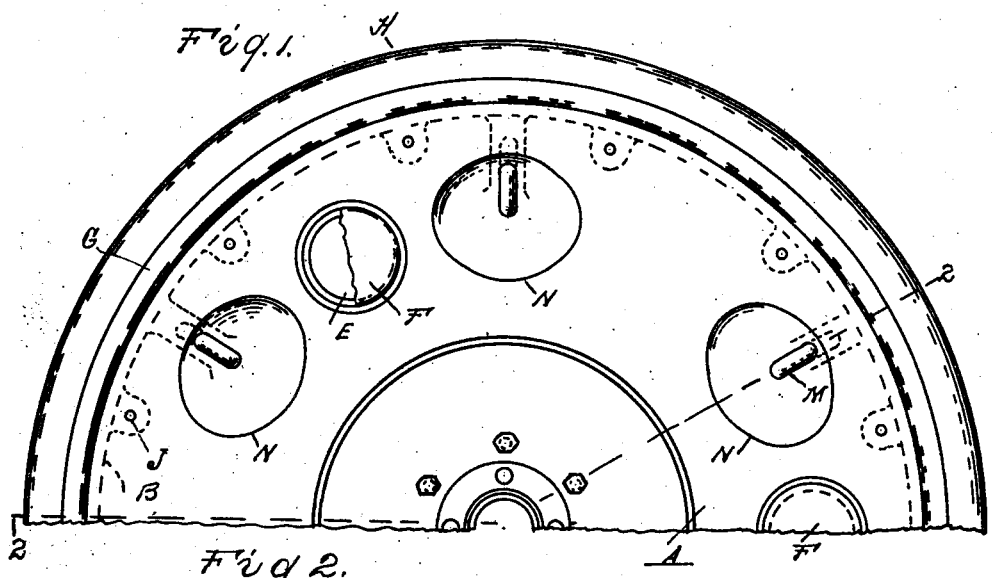
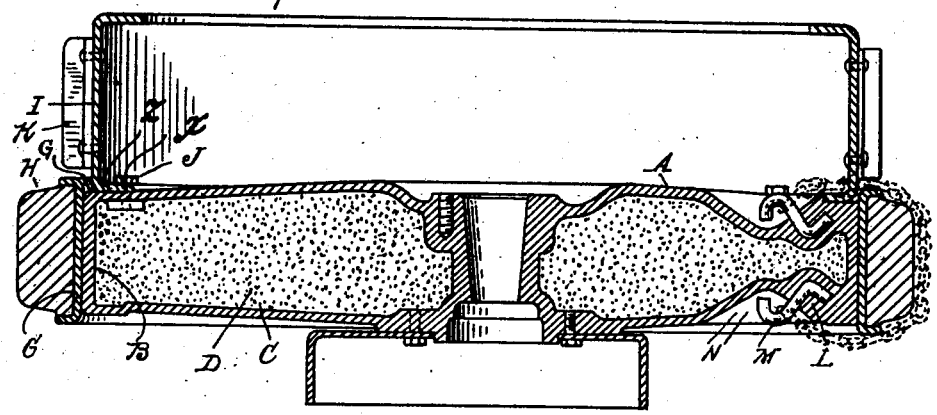
Inventor
Thomas C. Whitehead
By Whittemore, Hulbert, Whittemore, & Belknap
Attorneys Patented Oct. 24, 1922.

1,433,164

UNITED STATES PATENT OFFICE.

THOMAS C. WHITEHEAD, OF DETROIT, MICHIGAN.

VEHICLE WHEEL.

Application filed February 21, 1921. Serial No. 446,910.

*To all whom it may concern:*

Be it known that I, THOMAS C. WHITEHEAD, a citizen of the United States of America, residing at Detroit, in the county of Wayne and State of Michigan, have invented certain new and useful Improvements in Vehicle Wheels, of which the following is a specification, reference being had therein to the accompanying drawings.

This invention relates to vehicle wheels and more particularly to wheels for tractors or the like.

It is an object of the invention to provide a double rim for a vehicle wheel, one of the rim members receiving a solid tire adapting the vehicle equipped with such wheels to travel upon a paved surface without injury thereto, and the other rim member being cleated to furnish proper traction upon a yielding surface, and more particularly wet or muddy ground, the tread diameter of the tire being sufficiently greater than the overall diameter of the cleated rim to insure engagement solely of said tire with the pavement or unyielding surface, while when the described wheel engages a muddy or yielding surface the weight of the vehicle will cause the tire carrying portion of the rim to sink sufficiently to engage the cleated member of the rim with said surface, and thus afford the necessary traction.

Another object of the invention is to provide a vehicle wheel of a double disk type, a hollow chamber intermediate the disks being utilized to receive material such as concrete, for increasing the weight of the wheel and thereby improving its traction.

A further feature of the invention is the provision of hooks upon the outer portion of a disk wheel for engagement by tire chains, and the formation of pockets in the disk body of the wheel for receiving said hooks to avoid said hooks forming undesirable projections.

In the drawings:

Figure 1 is a view in side elevation of a wheel improved in accordance with the invention.

Figure 2 is a transverse sectional view of the wheel, the section being taken on line 2—2 of Figure 1.

In these views the reference character A designates the body of the wheel, said body being formed of disk members dished toward each other and integrally formed at their peripheries with the rim B. Between the disk members A there is formed a chamber C which, in accordance with the invention, is adapted to be filled with concrete or like material as indicated at D, to add to the weight of the wheel and thus correspondingly improve the traction. To permit the introducing of said material into the chamber C, it is preferred to form one of the disks A (and preferably that one which is to be adjacent the vehicle), with a number of man-holes E, which may be of circular form and located adjacent the rim, and are normally engaged by cover members F. The felly portion B of said wheel is engaged by the rim G, upon which a cushion tire H is mounted, said tire being preferably formed of rubber. The rim G projects beyond the sides of the felly portion and thereby provides an annular shoulder G'. I is an auxiliary rim which may be formed of sheet metal, and which is bolted as indicated at J to the felly portion B of said wheel, preferably abutting against an annular shoulder X formed upon the outer face of the wheel. The annular shoulder X forms a pilot for the flange Z of the supplemental rim. The rim I is transversely cleated as indicated at K, the outside diameter of the cleated rim being less by a predetermined amount than the diameter of the tread surface of said tire. The cast member of the wheel has thickened portions L at the juncture of the disk members A with the rim B, and the shank portions of hooks M are cast into said thickened portions, the hooked ends of the said members M projecting divergently toward the axes of the wheel. It is preferred to form pockets N in each disk member to receive the projecting ends of said hooks so that there will be no danger of the hooks being broken off through forming obstructions at the sides of the wheel. Said hooks are adapted for engagement by the usual tire chains, one of which is indicated in dash lines in Figure 2.

In the use of the described wheel, when a vehicle equipped therewith is travelling upon an unyielding or paved surface, the traction will be secured entirely through engagement of the tire H with said surface, said tire maintaining the cleated rim I out of contact with the pavement. When, however, such a vehicle encounters a relatively soft surface, and more particularly wet or muddy ground, the tire H will sink into such a surface permitting the latter to be engaged by the cleated rim I which will then afford the necessary traction which could not, on such a surface, be derived from tire H.

Weighting of the wheel by filling the chamber C thereof with heavy material D is desirable since it results in an improved traction and tends to impart to the vehicle as a whole, a more stable equilibrium. It is a desirable feature of thus applying weight to the wheel, that such weight need not be transmitted through the axles of the vehicle, and places no strain upon said axles or upon the frame of the vehicle proper. In the use of the described wheel, the hooks for engagement by tire chains are a desirable provision, although the use of such chains will be unnecessary except under exceptional conditions such as travelling of the wheel over a surface having a considerable coating of snow, such as might prevent proper traction being afforded either by the yieldable tire or cleated rim.

What I claim as my invention is:

1. The combination with a vehicle wheel having a rim thereon, of an auxiliary rim detachably secured to said wheel, said auxiliary rim being provided with parallel flanges, and an annular shoulder on one side of said wheel forming a seat for one of the flanges of said auxiliary rim.

2. The combination with a vehicle wheel, of an auxiliary rim detachably secured to said wheel, said auxiliary rim having an annular flange, and an annular shoulder on one side of said wheel forming a seat for said flange.

In testimony whereof I affix my signature.

THOMAS C. WHITEHEAD.